July 4, 1967     H. A. KIERNAN     3,329,166
VALVE
Filed July 28, 1966     2 Sheets-Sheet 2
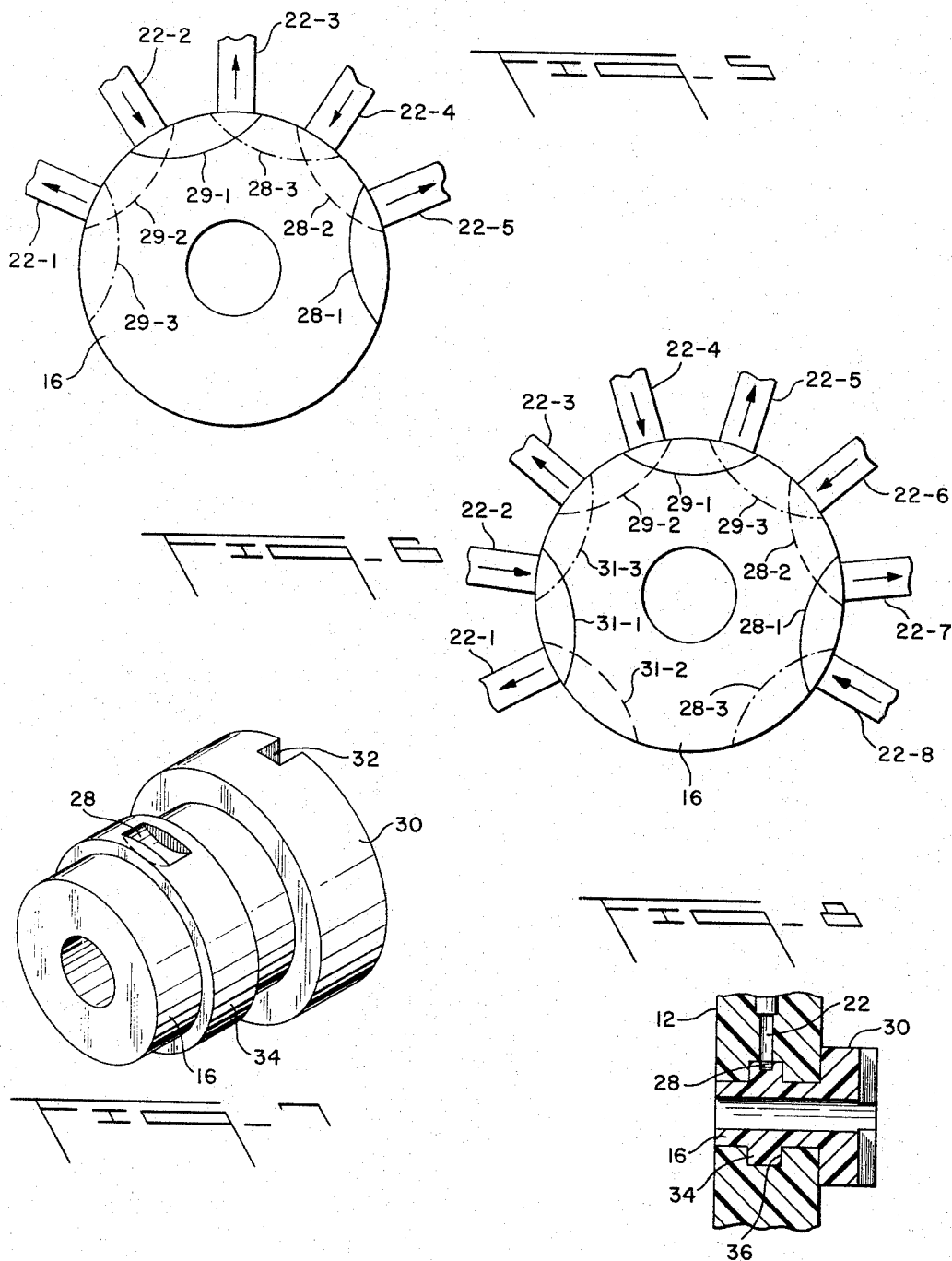
INVENTOR.
HAROLD A. KIERNAN
BY
*Samuelson & Jacob*
ATTORNEYS

United States Patent Office 3,329,166
Patented July 4, 1967

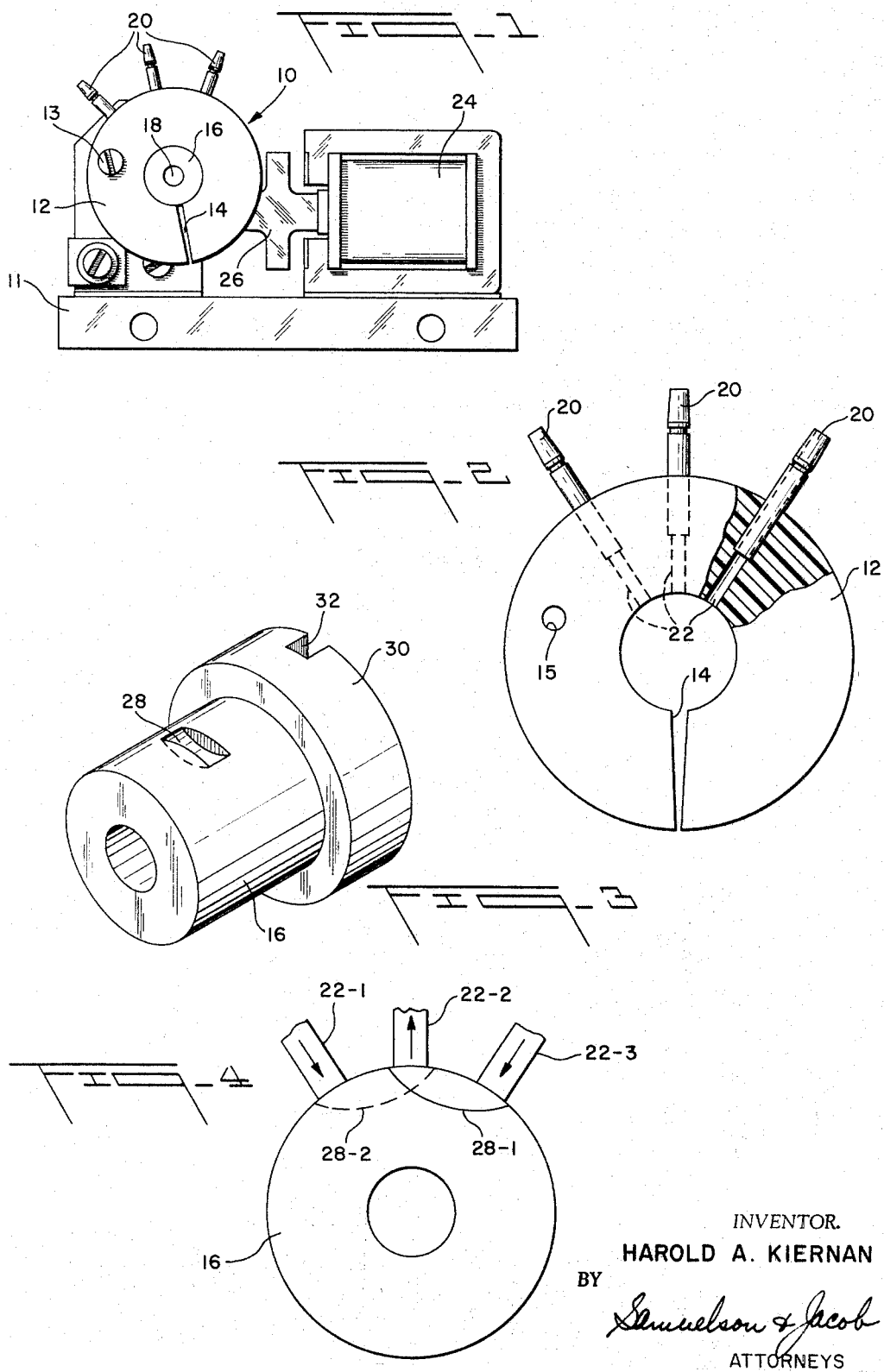

3,329,166
VALVE
Harold A. Kiernan, 5 Plains Drive,
New City, N.Y. 10956
Filed July 28, 1966, Ser. No. 568,582
10 Claims. (Cl. 137—625.16)

The invention relates to valves having an outer body member and an inner member which is movable with respect to the outer body member. In particular, the invention relates to such valves wherein there is a minimum of holdup volume (fluid remaining in the valve) and practically no contamination of the subsequent stream. The invention is primarily directed toward providing a valve which may be used in chemical and other analyses to, for example, compare the characteristics of a standard or known solution with those of an unknown solution.

In its preferred form, the valve of the invention comprises an outer body member having three passages therein leading from the outer wall of the body member to an inner central opening in the body member and an inner member which is movable with respect to the body member. The inner member is provided with a slot which connects the intermediate passage with one of the outer passages in a first discrete position and the intermediate passage with the other of the outer passages in a second discrete position.

Both the materials of the outer body member and the inner member are such that they are inert and do not react with the fluid being transmitted through the valve. Preferably, the outer body member should be formed of polymerized tetrafluorethylene commonly sold under the trademark Teflon and the inner member should be formed of trifluoromonochloroethylene commonly sold under the trademark Kel–F. It it important to the practice of the invention that the material of which the body member is formed be softer than that forming the inner member. In order to obtain a packless valve, it is necessary to ensure that there will be intimate contact between the mating surfaces of the inner and outer members. This is accomplished by making the radius of the inner member equal to the radius of the central opening in the outer body member.

In order to facilitate installation of the inner member in the central opening of the outer body member, the outer body member is provided with a slit. To install the inner member in the body member the slit is spread apart and the inner member is inserted in the central opening of the body member. The force on the slit is released and the outer body member due to the inherent elastic memory of the material of which it is formed closes around the inner member and forms a packless seal at the mating surfaces of the two members.

It should be understood that the body member and the inner member may be formed of other materials than those mentioned above as long as the body member material is softer than that of the inner member and has elastic memory.

It is an important object of the invention to provide a valve in which there is a minimum of holdup volume from the previous flow to the subsequent flow.

It is a further object of the invention to provide such a valve wherein there is practically no contamination of the next flow.

It is a still further object of the invention to provide such a valve wherein the material from which the valve is formed is inert and does not contaminate the fluid flowing therethrough.

It is a still further object of the invention to provide such a valve which does not require any packing, is self-sealing and which may be easily assembled.

It is a still further object of the invention to provide such a valve which has a plurality of passages in the body member and a plurality of combinations of feeds which may be obtained by suitable movement of the inner member.

These and other objects, advantages, features and uses will be apparent in the course of the following description when taken in conjunction with the accompanying drawings wherein:

FIGURE 1 is a side elevational view of a preferred form of valve of the invention having three passages therein;

FIGURE 2 is an enlarged elevational view, partly in section, of the outer body member of the valve of FIGURE 1;

FIGURE 3 is an enlarged perspective view of the inner member of the valve of FIGURE 1;

FIGURE 4 is a diagrammatic schematic view of the valve of FIGURE 1 showing the two discrete positions of the inner member;

FIGURE 5 is a view similar to FIGURE 4 of a five passage valve in which the inner member assumes three discrete positions;

FIGURE 6 is a view similar to that of FIGURE 4 wherein there are eight passages in the valve and the inner member assumes three discrete positions;

FIGURE 7 is a perspective view similar to that of FIGURE 3 showing a modified form of inner member intended for use with solutions of higher pressure; and FIGURE 8 is a sectional view showing the inner member of FIGURE 7 mated with the outer body member.

In the drawings, wherein, for the purpose of illustration are shown various embodiments of the invention, the numeral 10 generally designates a three passage valve assembly of the invention. Valve assembly 10 is seen to comprise frame 11 on which are mounted the various elements of the valve assembly 10. Body member 12 which is slit as shown at 14 is mounted to the frame by means of mating screw 13 and hole 15. Inner member 16 is mounted on shaft 18 and keyed thereto by means of ring 30 and slit 32 which mate with a key affixed to shaft 18 (details not shown). Shaft 18 is suitably attached to moment arm 26 which is actuated by solenoid 24. Nipples 20 are affixed to body member 12 so that connection is made to passages 22. Nipples 20 are suitably connected to the sources of solution and to the output by means of rubber or plastic hoses in a manner well-known in the art. Slot 28 is provided in inner member 16 to connect two of the passages 22 so that fluid flows from the source to the output through the two selected passages and the slot 28.

In FIGURE 4 there is illustrated a schematic view showing the two positions of the inner member and the effect of the two positions on the fluid flow. Line 28–1 indicates the position of movable member 16 in its first discrete position and line 28–2 indicates the position of slot 28 in its second discrete position. Numerals 22–1, 22–2 and 22–3 designate the three passages of the valve of FIGURE 1. While passage 22–2 has been designated as an outflow passage and passages 22–1 and 22–3 have been designated as inflow passages, these conditions could be reversed and 22–2 could be an inflow passage and 22–1 and 22–3 could be outflow passages.

In position 28–1, flow of fluid occurs from passage 22–3 through slot 28 and then to passage 22–2. In this position flow in passage 22–1 is inhibited. In the valve assembly of FIGURE 1 normal flow is from passage 22–3 to passage 22–2 and when solenoid 24 is actuated, the moment arm 26 rotates shaft 18 so that slot 28 takes the position of 28–2. In this position fluid flow in passage 22–3 is inhibited and the fluid flows between passages 22–1 and 22–2. Obviously, this situation could be reversed by making the appropriate connection to solenoid 24. Moreover, it is not necessary that shaft 18 be actuated by a solenoid as other means such as hydraulic or manual methods may also be used to rotate inner member 16 to its desired position.

FIGURE 5 is a view similar to FIGURE 4 of a five passage outer member and a two slot, inner member. The five passages have been designated 22–1, 22–2, 22–3, 22–4 and 22–5. The two slots have been designated 28 and 29. In addition the three discrete positions of the two slots have been designated by lines 28–1, 28–2, 28–3 and 29–1, 29–2 and 29–3. In the first position, namely 28–1 and 29–1, flow of fluid occurs between passages 22–2 and 22–3 and fluid flow is inhibited in passages 22–1, 22–4 and 22–5. In the second position, namely, positions 28–2 and 29–2, shown in the dashed lines of the figure, fluid flow occurs between passages 22–1 and 22–2 and passages 22–4 and 22–5 and fluid flow is inhibited in passage 22–3. In the third position, namely positions 28–3 and 29–3, shown in the dot-dash lines of the figure, fluid flow occurs between passages 22–3 and 22–4 and fluid flow is inhibited in passages 22–1, 22–2 and 22–5.

FIGURE 6 is a view similar to FIGURES 4 and 5 of an eight passage valve having three slots on the rotor 16. The eight passages are designated 22–1, 22–2, 22–3, 22–4, 22–5, 22–6, 22–7 and 22–8. The three slots in the inner member 16 are designated 28, 29 and 31 and the three discrete positions of the slot due to the rotary movement of the inner member 16 are designated 28–1, 28–2 and 28–3 and 29–1, 29–2 and 29–3 and 31–1, 31–2 and 31–3. In the first position, namely, 28–1, 29–1 and 31–1, fluid flow occurs between passages 22–1 and 22–2 and between passages 22–4 and 22–5 and between passages 22–7 and 22–8. In this first position, fluid flow is inhibited in passages 22–3 and 22–6. In the second position, shown by the dashed lines 28–2, 29–2 and 31–2, fluid flow occurs between passages 22–3 and 22–4 and between passages 22–6 and 22–7. In this second position, fluid flow is inhibited in passages 22–1, 22–2, 22–5 and 22–8. In the third position, shown by the dot-dash lines 28–3, 29–3 and 31–3, fluid flow occurs between passages 22–2 and 22–3 and between passages 22–5 and 22–6. In this third position fluid flow is inhibited in passages 22–1, 22–4, 22–7 and 22–8.

In FIGURES 7 and 8 there is illustrated a further embodiment of body member and movable inner member to be used in valves of the invention. Inner member 16 is provided with an annular projection 34 and body member 12 is provided with an annular recess 36. The ring 34 mates with the recess 36 so that the flow of high pressure fluids between the mating surfaces of the inner member and the body member is inhibited. In the earlier described embodiment of FIGURES 1, 2 and 3, the packless valve of the invention is capable of withstanding pressures of up to about the order of 20 lbs. per square inch. In the embodiment of FIGURES 7 and 8 the valve of the invention is capable of withstanding pressures at the mating surfaces of the body member and the inner member of the order of about 100 lbs. per square inch. Consequently, the embodiment of FIGURES 7 and 8 may be used when gases are fed through the passages 22 and the slot 28 whereas the embodiment of FIGURES 1 through 3 will not readily handle the flow of gases, under pressure, therethrough. Moreover, the maximum pressure may be considerably higher than 100 p.s.i. if the body member 12 is encased in metal.

Obviously, the embodiment of FIGURES 7 and 8 may be used for valves having a plurality of passages such as have been shown and described above.

As various changes could be made in the above described apparatus without departing from the scope of the invention, it is intended that all matter contained in the above description or shown in the accompanying drawings shall be interpreted as illustrative and not in a limiting sense.

What is claimed is:
1. A valve comprising:
a body member having an outer wall and a circular central opening;
a circular disk, inner member mounted in the central opening of the body member and movable therein so as to assume at least two discrete positions with respect thereto;
at least two passages in the body member connecting the central opening and the outer wall, the passages being capable of conducting a fluid therethrough;
slot means in the outer circular surface of the inner member for connecting the two passages in the body member to permit the flow of fluid from one to the other of said passages in a first discrete position and inhibiting the flow of fluid from one to the other of said passages in a second discrete position;
means for moving the inner member to either the first discrete position or the second discrete position;
the body member being formed of a material having elastic memory, the said material being softer than that forming the inner member;
the diameter of the central opening of the body member being equal to the outer diameter of the inner member;
the body member being provided with a slit between the outer wall and the central opening which is spread apart in order to insert the inner member in the central opening of the body member and which, upon release, draws together due to the material's elastic memory to effectively seal the junction betwen the mating surfaces of the inner member and the body member.

2. The valve of claim 1 wherein there are three passages and
in the first discrete position, the first of the passages is connected to the second of the passages to permit fluid flow therebetween and fluid flow in the third of the passages is inhibited;
in the second discrete position, the first of the passages is connected to the third of the passages to permit fluid flow therebetween and fluid flow in the second of the passages is inhibited.

3. The valve of claim 2 wherein the inner member has an annular projection around its outer circumference and the central opening of the body member has an annular recess around its inner circumference to receive the annular projection and thereby further inhibit any flow of fluid from between the mating surfaces.

4. The valve of claim 1 wherein there are a plurality of passages in the body member and a plurality of slot means in the outer circular surface of the inner member and the inner member is movable such that the plurality of slot means connect at least some different passages in one of the discrete positions than in another of the discrete positions.

5. The valve of claim 4 wherein there are five such passages denominated 1, 2, 3, 4 and 5 and two such slot means;
the inner member being movable to three discrete positions such that:
in the first discrete position there is fluid flow between passages 2 and 3 and fluid flow in passages 1, 4 and 5 is inhibited;
in the second discrete position there is fluid flow between passages 1 and 2 and between passages 4 and 5 and fluid flow in passage 3 is inhibited; and
in the third discrete position there is fluid flow between passages 3 and 4 and fluid flow in passages 1, 2 and 5 is inhibited.

6. The valve of claim 5 wherein the inner member has an annular projection around its outer circumference and the central opening of the body member has an annular recess around its inner circumference to receive the annular projection and thereby further inhibit any flow of fluid from between the mating surfaces.

7. The valve of claim 4 wherein there are eight such passages denominated 1, 2, 3, 4, 5, 6, 7, 8 and three such slot means;

the inner member being movable to at least three discrete positions such that:

in the first discrete position there is fluid flow between passages 1 and 2, 4 and 5, and 7 and 8 and fluid flow is inhibited in passages 3 and 6;

in the second discrete position there is fluid flow between passages 3 and 4 and 6 and 7 and fluid flow is inhibited in passages 1, 2, 5 and 8; and in the third discrete position there is fluid flow between passages 2 and 3 and 5 and 6 and fluid flow is inhibited in passages 1, 4, 7 and 8.

8. The valve of claim 7 wherein the inner member has an annular projection around its outer circumference and the central opening of the body member has an annular recess around its inner circumference to receive the annular projection and thereby further inhibit any flow of fluid from between the mating surfaces.

9. The valve of claim 4 wherein the inner member has an annular projection around its outer circumference and the central opening of the body member has an annular recess around its inner circumference to receive the annular projection and thereby further inhibit any flow of fluid from between the mating surfaces.

10. The valve of claim 1 wherein the inner member has an annular projection around its outer circumference and the central opening of the body member has an annular recess around its inner circumference to receive the annular projection and thereby further inhibit any flow of fluid from between the mating surfaces.

References Cited

UNITED STATES PATENTS

| 260,073 | 6/1882 | Williams | 251—309 |
| 2,946,348 | 7/1960 | North | 137—625.21 |
| 3,057,370 | 10/1962 | Hamilton | 251—368 |

FOREIGN PATENTS

| 22,670 | 6/1883 | Germany. | |

M. CARY NELSON, *Primary Examiner.*

W. R. CLINE, *Assistant Examiner.*